United States Patent
Andersen et al.

(10) Patent No.: US 9,789,516 B2
(45) Date of Patent: Oct. 17, 2017

(54) PROCESS FOR SEPARATING SYNTHETIC TURF PRODUCT

(71) Applicant: RE-MATCH (UK) LIMITED, London (GB)

(72) Inventors: Dennis Andersen, Risskov (DK); Michael Riggenmann, Weissenhorn (DE)

(73) Assignee: RE-MATCH (UK) LIMITED, London (GB)

( * ) Notice: Subject to any disclaimer, the term of this patent is extended or adjusted under 35 U.S.C. 154(b) by 0 days.

(21) Appl. No.: 14/940,652

(22) Filed: Nov. 13, 2015

(65) Prior Publication Data
US 2016/0067745 A1   Mar. 10, 2016

Related U.S. Application Data

(63) Continuation of application No. 14/059,800, filed on Oct. 22, 2013, now Pat. No. 9,205,460.

(30) Foreign Application Priority Data

Oct. 21, 2013  (EP) .................................... 13189494

(51) Int. Cl.
*B07C 5/02* (2006.01)
*B07B 9/02* (2006.01)
(Continued)

(52) U.S. Cl.
CPC .............. *B07B 9/02* (2013.01); *B29B 17/02* (2013.01); *E01C 13/08* (2013.01);
(Continued)

(58) Field of Classification Search
CPC ........ B07B 9/02; B29B 17/02; Y02W 30/523; Y02W 30/524; Y02W 30/622
(Continued)

(56) References Cited

U.S. PATENT DOCUMENTS 3,261,463 A * 7/1966 Eveson ..................... B03B 4/06
                                                            175/66
5,185,380 A   2/1993 Diessel et al.
(Continued)

FOREIGN PATENT DOCUMENTS

EP    2096211 A2   9/2009
EP    2186942 A1   5/2010
(Continued)

OTHER PUBLICATIONS

Extended European Search Report for European Patent Application No. 13189494.1, dated May 8, 2014.

*Primary Examiner* — Terrell Matthews
(74) *Attorney, Agent, or Firm* — MKG, LLC

(57) ABSTRACT

A process for separating synthetic turf product comprising includes the consecutive steps of: (a) downsizing the synthetic turf product into a downsized turf material; (b) separating the downsized turf material by sieving into at least a first fraction substantially comprising a mixture of backing material and additional components and a second fraction substantially comprising grass fiber components; (c) separating the first fraction by specific gravity to provide a low density fraction and a high density fraction; (d) separating the second fraction by specific gravity and size by providing an airflow directed upwards in a separator configured to cause a swirling motion whereby a lighter fraction is entrained upwards in the air flow and a heavy fraction is allowed to fall downwards; and (e) collecting the low density fraction and the light fraction.

8 Claims, 2 Drawing Sheets

(51) Int. Cl.
  *B29B 17/02* (2006.01)
  *E01C 13/08* (2006.01)
  *B29L 31/00* (2006.01)

(52) U.S. Cl.
  CPC ......... *B29B 2017/0224* (2013.01); *B29B 2017/0234* (2013.01); *B29L 2031/732* (2013.01); *Y02W 30/523* (2015.05); *Y02W 30/524* (2015.05); *Y02W 30/622* (2015.05)

(58) Field of Classification Search
  USPC .................................................. 209/3.1
  See application file for complete search history.

(56) References Cited

U.S. PATENT DOCUMENTS

| | | | |
|---|---|---|---|
| 5,497,949 A | 3/1996 | Sharer | |
| 5,562,779 A | 10/1996 | Allaway et al. | |
| 6,299,959 B1 | 10/2001 | Squires et al. | |
| 7,152,742 B2* | 12/2006 | Donaj | B03B 1/04 209/173 |
| 7,469,846 B2* | 12/2008 | Schu | B01D 21/0012 209/12.1 |
| 8,205,814 B2* | 6/2012 | Lindsey | B29B 17/02 241/24.19 |
| 8,464,801 B2 | 6/2013 | Bearden | |
| 9,205,460 B2* | 12/2015 | Andersen | B07B 9/02 |
| 2001/0009710 A1 | 7/2001 | Zegler et al. | |
| 2001/0033902 A1 | 10/2001 | Seaton | |
| 2004/0094457 A1* | 5/2004 | Donaj | B03B 1/04 209/162 |
| 2012/0031814 A1 | 2/2012 | Hinkel | |
| 2012/0315816 A1* | 12/2012 | Fowler | B32B 5/022 442/327 |
| 2013/0017023 A1 | 1/2013 | Nicholls et al. | |
| 2013/0112790 A1 | 5/2013 | Rees et al. | |
| 2013/0280445 A1* | 10/2013 | McAnany | E01C 13/08 428/17 |
| 2014/0312526 A1* | 10/2014 | Kwak | B29B 17/02 264/176.1 |
| 2015/0108041 A1* | 4/2015 | Andersen | B07B 9/02 209/3.1 |
| 2016/0256875 A1* | 9/2016 | Park | B07B 1/22 |

FOREIGN PATENT DOCUMENTS

| | | |
|---|---|---|
| KR | 20130106053 A | 9/2013 |
| WO | 2004042149 A1 | 5/2004 |
| WO | 2008064012 A2 | 5/2008 |
| WO | 2010075098 A1 | 7/2010 |

* cited by examiner

PROCESS FOR SEPARATING SYNTHETIC TURF PRODUCT

CROSS REFERENCE TO RELATED APPLICATIONS

The present application is a continuation of, and claims priority benefit under 35 U.S.C. §120 to, co-pending U.S. patent application Ser. No. 14/059,800, filed on Oct. 22, 2013, which claims foreign priority under 35 U.S.C. §119(b) to EP 13189494.1, filed on Oct. 21, 2013. The entireties of the aforementioned applications are incorporated by reference herein.

TECHNICAL FIELD

The present invention relates to an improved method for reclaiming the individual components of synthetic or artificial turf product in a form almost similar to their original outset. The result is achieved by a method in which the turf after downsizing is subjected to at least three specific separation steps in a specific order hence the separation is based on size, specific gravity and specific gravity, size and shape.

BACKGROUND

Synthetic turf has been used for many years as surfaces for football, baseball, and soccer fields. In the recent years it has been used in other applications where an alternative to natural grass is desired. These applications include at least playgrounds, residential and commercial lawns and other landscaping, paths, paintball fields, tennis courts, putting greens, dog runs etc.

Typically, synthetic turf includes a grass-like fabric having a backing and a plurality of upstanding ribbons, also called face fibers, resembling grass. Many synthetic turf products also include an infill material dispersed among the upstanding ribbons, which may consist of sand, tire rubber crumb, or other particulates, either singularly or in combination with each other. The infill material simulates the soil in natural turf, acts as a ballast, and/or contributes to the physical properties of the turf, such as resiliency, that make the turf suitable for a particular use.

Synthetic turf has a limited life span, depending on the construction of the turf, the application for which it is used, weathering and how the turf is maintained.

As an example, a typical synthetic turf for use as an athletic field may have a useful life of from about 8 to 15 years. A large amount of synthetic turf is currently being used in hundreds of athletic fields and in other applications.

Disposing of the turf is very expensive due to the composition of materials ranging from recycled rubber over sand to plastic. To avoid sending that turf to landfills at a substantial cost, recycling and reusing all or portions of the synthetic turf has been an explored option over recent years.

Methods for recycling carpets and for preparing carpet backing using recycled carpet scrap are known. Some of such methods involve separating the carpet yarns, or tufts, from the backing, e.g. by cutting, and processing only yarns.

However, synthetic turf differs in composition from carpet, and those differences in composition make conventional carpet recycling processes unsuitable for recycling synthetic turf. The majority of carpet products use nylon face fibers, while the majority of current synthetic turf products use polyethylene.

The primary coating of most carpets is a latex coating, while the coating in most synthetic turf is polyurethane. In the United States, only a small fraction of broadloom carpet includes a coating containing polyurethane, and only a small fraction of synthetic turfs have a coating containing latex.

Most of the synthetic turf manufactured in the past 6 years has had a polyurethane coating applied to the backing. There is a belief that polyurethane coated synthetic turf as a whole cannot be recycled. This is because the polyurethane coating, cannot be efficiently recycled. Polyurethane is thermoset (versus thermoplastic) and is therefore difficult and costly to recycle.

Notwithstanding, recovery of polyurethane from carpets is described in U.S. Pat. No. 5,185,380 where the backing is scraped off, comminuted, subjected to a cyclone classification step to remove hard foreign constituents, such as metals and PVC, and the non-hard constituents are consolidated under elevated pressure and temperature to provide sheets. This method then provides a new product from parts of the used carpet.

In turf, the coating is applied to the backing of a tufted material for the purpose of locking the face fibers into the primary backing. An additional coating of a hot melt adhesive or a polyurethane foam can also be applied. This secondary coating is typically used to attach a secondary backing which can be polyester or polypropylene.

Many synthetic turf products include components that are not found in carpet and that are incompatible with, or at least undesirable in, conventional carpet recycling methods. For example, conventional carpet does not include infill. Typical infill materials for synthetic turf installations include sand, tire rubber crumb, and/or other particulates, either singularly or in combination with each other. Thus, recycling synthetic turf presents a unique problem not encountered in the recycling of carpet.

Separating infill from the remainder of the turf may require use of special equipment, and there may be environmental concerns associated with disposing of the separated infill. Additional concerns in the recycling process are the effect of any residual infill particulates on the size reduction process and on the properties of the final product.

Thus, attempts have been made to recycle and reusing an existing synthetic turf, or at least a portion of an existing synthetic turf, to avoid sending the entire synthetic turf to a landfill when it is no longer useful. Such a process is described in WO 2010/075098 in which infill is separated from the backing and the grass like fibers followed by downsizing and further removal of infill followed by agglomeration. The granules of agglomerated turf fragments are placed into an extruder. The granules are extruded to form an extrudate, for example in the shape of a strand or ribbon.

Most known processes consequently recycle the constituents of carpets or turfs to new products of mixed components and do not reverse engineer the products into the individual starting components.

Hence, existing processes can separate the materials to a purity of 95% only which is satisfactory when for example the process is for extruding/consolidating for providing new products. Thus, while the prior art processes are an improvement over disposing the material at the land fill, there is still a need to separate the individual parts further such as to fractions substantially comprising one component in order to provide improved grade products.

It is also desirable to provide processes that are flexible so that the composition of the turf and the infill may vary.

It is also desirable to provide processes in which the result is the individual components purified to a degree that is high enough for reuse as turf or in other industries.

Therefore, the aim of the present invention is to provide an improved process for separating constituents of various turf products and also to provide a process where the purity of each of the separated constituents exceeds 95% weight percent (wt %) to being essentially pure.

SUMMARY

In a first aspect this and further objects are solved by a process in which a substantially dry synthetic turf product comprising at least a backing material, a grass fiber component and additional components is provided and where said process comprises at least the consecutive steps of (a) downsizing the synthetic turf product into a downsized turf material;

(b) separating the downsized turf material by sieving into at least a first fraction substantially comprising a mixture of the backing material and the additional components and a second fraction substantially comprising grass fiber components;

(c) separating the first fraction obtained in step (b) by specific gravity using air into a low density fraction substantially comprising the backing material and a high density fraction substantially comprising the additional components;

(d) separating the second fraction obtained in step (b) by specific gravity, size and shape by providing an airflow directed upwards in a separator configured to cause a swirling motion whereby a lighter fraction is entrained upwards in the air flow and a heavy fraction is allowed to fall downwards; where the lighter fraction substantially comprises grass fiber components, and the heavy fraction substantially comprises a mixture of backing material and additional components; and (e) collecting the low density fraction obtained in step (c) and the lighter fraction obtained in step (d).

Complete separation of components from used turf products has proven to be a very difficult task. The problem arises with separating in particular the last 5% of the other constituents in the various fractions. During the downsizing, which is necessary to make the turf product manageable, the individual components get further mixed and more homogenous and hence more difficult to separate. Essentially complete separation is necessary in order to be able to reuse the various fractions in a high end product.

The sequence and specific mode of separation of the individual components, i.e. whether simple sieving by size, separation by specific sieving, i.e. by specific gravity, and/or separation by air swirling, i.e. specific gravity, size and shape, has enabled the achievement of complete separation.

In the first downsizing step the backing material and the grass fiber components are the primary target. Most additional components, such as dirt, come in a reduced size.

In the first separation step the components are separated by size alone. Given that the product has been downsized, this step will separate the majority of the components from the grass fiber component. Thereby, the components having densities that are most similar have been separated and subsequently further downsizing may be possible, if desired.

After the first separation the first fraction substantially comprising the backing material is further separated by specific gravity using air. Hereby the lighter components are fluidized and separated from the heavy components. This will separate the backing material from the additional components, so that the backing material, being lighter than dirt etc., is isolated as the low density fraction.

Suitable separating means include but are not limited to separating tables available from Trenn- and Sortiertechnik GmbH and Guidetti Srl., Renazzo. Italy.

The second fraction from the first separation is separated by specific gravity, size and shape in one operational step. This separation is obtained by providing an airflow causing a swirling motion directed upwards in a separator whereby the lighter fraction is entrained upwards in the air flow and the heavy fraction is allowed to fall downwards; the lighter fraction substantially comprises grass fiber components, and the heavier fraction substantially comprises a mixture of backing material and additional components.

The separator used for the separation may be any suitable means in the art such as a cyclone separator, e.g. Hovex De-Sanding Cyclone from Gea AG, a zigzag air sifter, e.g. ZZS Air sifter from Trenn- and Sortiertechnik GmbH, or similar separating means.

In specific embodiments the sieving of step (b) is performed in a plurality of sets of sieves and/or the separation by specific gravity of step (c) is performed in a plurality of sets of separators and/or where the separation of step (d) is performed in a plurality of sets of separators.

It is contemplated that the plurality of sets of sieves etc. can be positioned in series and/or in parallel. When in parallel the capacity of the separation process can be increased while positioning in series is a means for increasing the yield without compromising the purity of each of the fractions for reuse.

In preferred embodiments the sieves are drum screens having apertures of 4-10 mm, such as 4, 4.5, 5 or 5.5, more preferably, 5 mm.

It is also contemplated that when one or more sieves are comprised in series in for example step b, an intermediate downsizing step can be included in between. In this way it is ensured that a larger proportion of the downsized material has obtained the desired largest dimension and at the same time the grass fiber fraction will contain less of other the other components originally present. It is contemplated that one or more sieves are present, when more than one it is contemplated that they are the same or different sizes. In one embodiment the first downsizing is approximately to 50 mm and the second downsizing step is approximately to 30 mm and in further embodiments the sieves have a mesh size of 6-8 mm, preferably 5 mm.

In a further embodiment the additional components comprise an infill and the first fraction obtained in step (b), before step (c), is subjected to an intermediate sieving step (i) to provide a third fraction substantially comprising backing material and a fourth fraction substantially comprising infill, and, wherein the third fraction substantially comprising backing material is further processed in step (c) and the fraction substantially comprising infill is recovered.

In a particular embodiment, the infill material comprises sand and rubber, and the fourth fraction obtained in step (i) is subjected to the further step (f) of separating by specific gravity to provide a low density fraction substantially comprising rubber and a high density fraction substantially comprising sand. After this separation step the rubber fraction and the sand fractions, respectively, is essentially pure.

Usually when the turf product originates from an athletic field rubber and/or sand is used as infill. While a large proportion of the sand and rubber may easily separate from the remaining part of the turf product, substantial amounts of sand and rubber are still present within the structure. In particular sand, dirt or gravel must be removed from the polymeric components in order to improve their usability in the same (i.e. artificial turf) or other types of products.

Being able to provide the rubber fraction essentially pure is necessary for reuse thereof in the same application. The purity of the rubber fraction can be determined by standard tests as described below.

In yet an embodiment the intermediate separation step (i) is performed by sieving through a plurality of sieves, preferably integrated in one unit, where at least a first sieve has a mesh size of 3 mm; and at least a second sieve has a mesh size 0.8 mm; said separation provides a large fraction where the length of the largest dimension of the downsized material is 3 mm or higher, said large fraction substantially comprising grass fiber components; an intermediate fraction where the length of the largest dimension of the downsized material is in the range of 0.8 to 3 mm and said intermediate fraction substantially comprising backing material; and a small fraction where the length of the largest dimension is 0.8 mm or smaller, said small fraction substantially comprising infill.

In this embodiment the large fraction is mixed with the second fraction obtained in step (b) before being further separated in step (d). The intermediate fraction is provided in step (c) and the small fraction is provided in step (f). By including this separatiostep n the yield of each fraction may be increased.

According to the process of the invention, the second fraction obtained in step (b) is in a preferred embodiment further downsized before being separated in step (d), for example in a cutting mill, preferably to a size where the length of the largest dimension of the downsized material is approximately, 7 to 9 mm, more preferred 8 mm.

As indicated above the task of separating becomes more and more difficult when the size of the mixed components becomes smaller and smaller. Thus, as the size becomes smaller the difference in weight of the individual components approximates. On the other hand, downsizing is a necessary means for being able to disintegrate the various components of the turf material.

Therefore, downsizing at these specific points in the separation has turned out to be effective since otherwise problematic components have substantially been separated off in the previous steps.

In a further preferred embodiment the separation of step (d) is performed in a zig-zag air sifter.

This will provide a separation where the now very small, more homogenous particles are separated by size, shape and specific gravity and where swirling motion is provided by structures within the separator. Hereby the enrichment of the grass fiber components is facilitated.

In yet a preferred embodiment the separation of step (d) is performed by supplying air in the separator at a frequency of 18-27 Hz, more preferred 20-25 Hz and most preferred 25 Hz. And in preferred embodiment the separation is performed in a zig zag air sifter at the above air frequencies.

Tests were performed with various frequencies above and below the ranges above, and it was surprisingly found that the best separation was obtained within the ranges disclosed, and the best result was obtained at 25 Hz.

In an even more preferred embodiment the separation by the swirling motion is performed in two steps, wherein the frequency of air of the first step is higher than the frequency in the second step. In yet another embodiment, the frequency was approximately 25 Hz in the first step and approximately 20 Hz in the second step. This combination resulted in a turf fraction which was essentially pure.

In preferred embodiments the starting material is dried to be substantially free of water. Drying is used, for example, in the separation steps where the separation is partially or wholly based on the weight of the components. The process of the invention is preferably a dry process throughout. Preferably, the turf product is dried before step a or between steps (a) and (b).

It is also contemplated that magnets are inserted at various points of the process for removing magnetic components or contaminants, and preferably the magnets are positioned before the cutting steps using a cutting mill in order to avoid destruction of the blades.

In a second aspect there is provided a system for separating synthetic or artificial turf product, the system is configured as detailed above.

Key to the process and system is the order of separation steps and in further embodiments the parameters of the separation steps. Different orders of separation, combination of separations and parameters resulted in an inferior end product, i.e. fractions comprising substantial amounts of other constituents and/or contaminants, which makes the fraction less usable as a high grade recycling product.

All embodiments and variations described with reference to the process equally apply to the system.

Another aspect the invention provides recycled components of an artificial turf product and more specifically recycled sand, recycled rubber, recycled grass fiber components and recycled backing material.

The products are characterized by a purity of more than 95% (w/w) of the fraction. Even more preferred more than 96% (w/w), more than 97% (w/w), more than 98% (w/w), more than 99% (w/w), or approximately 100% of the fraction.

Turf products often comprise components of different colours, hence the resulting fractions may be evaluated visually for evaluating purity.

Purity may also be evaluated using standard tests in the art such as D5603 from ASTM International for testing the purity of the rubber.

The products or fractions obtained by the process of the invention are useful as starting materials in a number of industries such as but not limited to rubber molding industry, construction industry, the synthtic turf industry and the plastic extrusion industry.

Therefore, in another aspect the invention can be seen as a process for providing a starting material in the manufacture of rubber tiles, rubber mats, rubber flooring, plastic pellets and plastic boxes; wherein the process comprises the steps and variations as outlined above.

DESCRIPTION OF THE INVENTION

Figure 1:
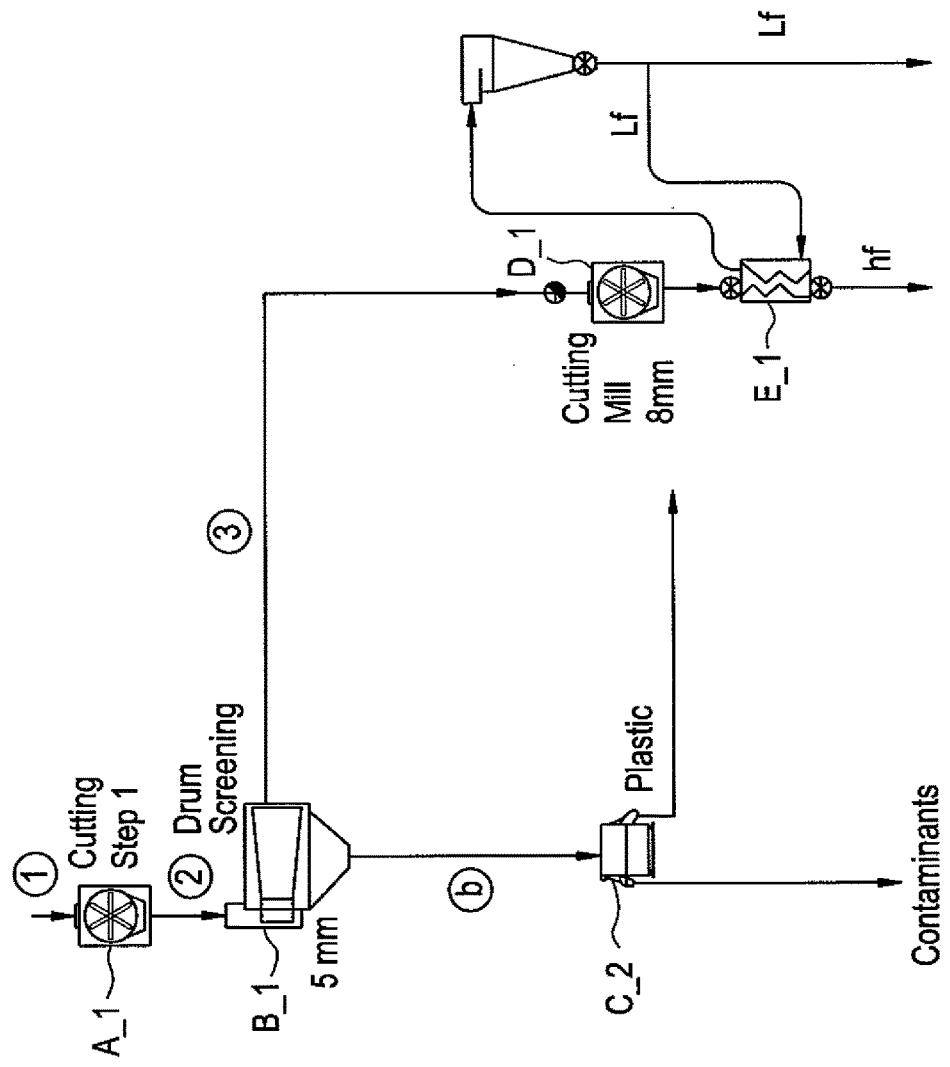
FIG. 1 is an illustration of the process of the invention in which the synthetic turf product does not comprise an infill.

In the context of the present invention "essentially pure" means that one component comprises more than 95% weight percent (wt %) of the fraction. Even more preferred more than 96% weight percent (wt %), more than 97% weight percent (wt %), more than 98% weight percent (wt %), more than 99% weight percent (wt %), or approximately 100%.

In the context of the present invention "substantially pure" means that more than half (w/w) of the fraction comprises a specific component.

As used in the present invention the term "a component" means one type of chemical composition of the starting product such as sand, rubber, polyethylene (PE), etc. The term should not be limited to the component originating from a specific part of the turf material but is rather defined by its type of chemical composition.

As used in the present invention the term "synthetic turf product" contemplates all the components of the starting material used in the process of the invention. Synthetic and artificial may be used interchangeably and have the same meaning, namely a grass like product made of non-biological material.

The starting material for the process of the invention is a turf product originating from a sports facility, a playground, a landscaping area and the like. The origin of the material should not be limiting. It is also contemplated that the material may comprise contaminants.

The synthetic turf product usually comprises at least a backing material and a grass fiber component.

In the context of the present invention the term "backing material" contemplates one or more layers for holding the grass fiber component. Thus, the term backing material includes but is not limited to a material in which an artificial grass fiber is tufted, woven or knitted or otherwise attached to. The term backing material also contemplates a secondary backing or coating or fastener parts for fastening pieces of turf products to each other or a surface.

In the context of the present invention the term "grass fiber component" contemplates fibers or yarns, textured or non-textured, tufted, woven or knitted or otherwise attached to the backing material.

In the context of the present invention the term "additional components" contemplates any material comprised in the turf product not comprised in the terms "backing material" and "grass fiber component". Thus, additional components may comprise, but are not limited to, infill, waste caught in the turf carpet, dirt, sand etc.

The synthetic turf product may also comprise a thatch or a "thatch zone" comprised of one or more thatching materials, preferably connected to the backing material such as by interweaving, gluing, melting or any suitable means for attaching thatching materials to the backing material. Thatching of synthetic turf is well known in the art and is described in several documents such as U.S. Pat. No. 6,299,959 and WO 2004/042149. In the context of the present invention the material constituting the thatch, thatch zone or thatching is included in the term "grass fiber material".

Typically, a synthetic turf product includes a fabric being a backing and a plurality of upstanding ribbons, also called face fibers or yarns, resembling grass, and, in the context of the present invention face fibers or yarns are examples of grass fiber components according to the invention.

Typically, the grass fiber component is made of polyethylene, polypropylene or a blend thereof. The grass fiber may also be made of nylon or any other material known in the art alone or in combination with polypropylene and/or polyethylene.

These grass fiber components are usually tufted or sewn into a primary backing material which can be made of different materials including, but not limited to, polypropylene and polyester.

A coating material may be applied to the grass fiber and primary backing to hold the grass like fibers in place.

The primary coating of most synthetic turf products includes polyurethane and also typically includes a coating filler such as calcium carbonate or coal fly ash. Primary coatings may also include latex, hot melt adhesives, and/or thermoplastics in addition to or instead of polyurethane.

Synthetic turf products may also have a secondary backing or coating which can be made of a number of different materials including, but not limited to, polypropylene and polyester.

The grass fiber components typically make up from about 19 wt % to about 80 wt % of a synthetic turf product. The primary backing typically makes up from about 1 wt % to about 25 wt % of a synthetic turf. The primary coating typically makes up from about 15 wt % to about 80 wt % of a synthetic turf however other compositions are contemplated.

The grass fiber components may include polyethylene, polypropylene, nylon, or other materials singly or in combination.

In some embodiments, the grass fibers include blends of polypropylene (PP) and polyethylene (PE). In further embodiments, the grass fibers include blends of PE or blends of PP, PE, and nylon.

The primary backing may include polyester, polypropylene, and other materials singly or in combination, such as blends of PP and polyester The coating may include polyurethane, latex, hot melt adhesive, and/or thermoplastics alone or in combination. Suitable hot melt adhesives include, but are not limited to, Reynolds 54-041, Reynolds 54-854, DHM 4124 (The Reynolds Company P.O. Greenville, S.C., DHM Adhesives, Inc. Calhoun, Ga.).

Suitable thermoplastics include, but are not limited to polypropylene, polyethylene and polyester. The coating may also include a coating filler that may be coal fly ash, calcium carbonate, iron oxide, or barium sulphate, or any other filler known in the art.

In further embodiments the synthetic turf product comprises an infill material dispersed among the upstanding ribbons of grass fiber, which contributes to the physical properties of the turf product making the turf suitable for a specific use.

Synthetic turf infill may be made of any material suitable for providing desired physical properties, such as but not limited to sand, gravel, cork, coco nut shells, polymer beads, and rubbers, including but not limited to crumb rubber, ethylene propylene diene monomer (EPDM) rubber, thermo plastic elastomers (TPE), and neoprene rubber alone or in combination.

In preferred embodiments the synthetic turf product further comprises one or more thatching materials connected to the backing material.

Thatching material are typically made of the same material as the grass fiber component, polypropylene or nylon.

In a preferred embodiment the infill material is rubber or sand. In yet another embodiment the infill material is rubber and sand.

In further embodiments it is contemplated that the synthetic turf product comprises an infill and one or more thatching materials.

When an artificial turf field is removed from the site it is usually cut in pieces of 50×50 and rolled. The rolls are transported to the site where they are to be further processed whether it being a landfill or a facility for recycling the product.

The thus parted turf field, the turf product, is provided to the process of the invention in rolls typically having a diameter of 2 to 5 m and a width of 1 to 2 m. The size of the turf product when arriving at the processing facility can be any size, and the invention should not be limited by the size of the incoming turf. The size of the turf product is limited by practical handling alone and the size of the first down sizing means.

In the following, embodiments of the process will be described with reference to FIGS. 1 and 2, which are flow schemes of the process. Variations, examples and details described below may apply to both embodiments.

The process of the invention will now be described in further details with reference to FIG. 1 where the process is illustrated in its most general form for an artificial turf product comprising a backing material a grass fiber component and additional components in the form of optional contaminants.

In a first step the artificial turf product, 1, is downsized in a first cutting step in a first shredder, A_1, downsizing the turf product to a size of approximately 30 mm, the downsized turf product, 2, is screened through a drum screen, B_1, having openings of 5 mm, whereby two fractions are provided; a first fraction, b, substantially comprising a mixture of backing material and additional components where the length of the largest dimension is below 5 mm and a second fraction, g, substantially comprising grass fiber components, where the length of the largest dimension is above 5 mm.

After the initial separation the first and second fractions are further processed independently.

The first fraction, b, substantially comprising backing is further separated by specific gravity in a separation means, C_2, where air is used to fluidize the low density particles guiding the denser particles to one outlet and low density particles to a second outlet.

The shredder and drum screen are components generally known in the art, the choice of specific units are within the skill of the art. The specific shredder used was a model H500/R2-2000 obtainable from Erdwich Zerkleinerungs-Systeme GmbH. The separation means usable for separating by specific gravity are obtainable from Trenn-und Sortiertechnik GmbH or Guidetti S.r.l., Renazzo, Italy.

The second fraction is in the embodiment shown further downsized in a cutting mill, D_1, to give smaller fraction sizes where the size of the largest dimension is 8 mm, however it is contemplated that the further downsizing may be omitted. After this downsizing, the second fraction, g, is separated by providing an airflow in a separator, E_1, configured to cause a swirling motion. In the embodiment shown the separator is a ZZS air sifter obtainable from Trenn-und Sortiertechnik GmbH in which the swirling motion is caused by zig zag channels within the sorting channel. The sorting provides a lighter fraction, lf, substantially comprising grass fiber components and a heavier fraction, hf, substantially comprising backing and additional components.

Given that the turf product tested was comprised of components of different colours, the resulting fractions were evaluated visually for purity. All fractions appeared visually as having primarily one colour.

Figure 2:
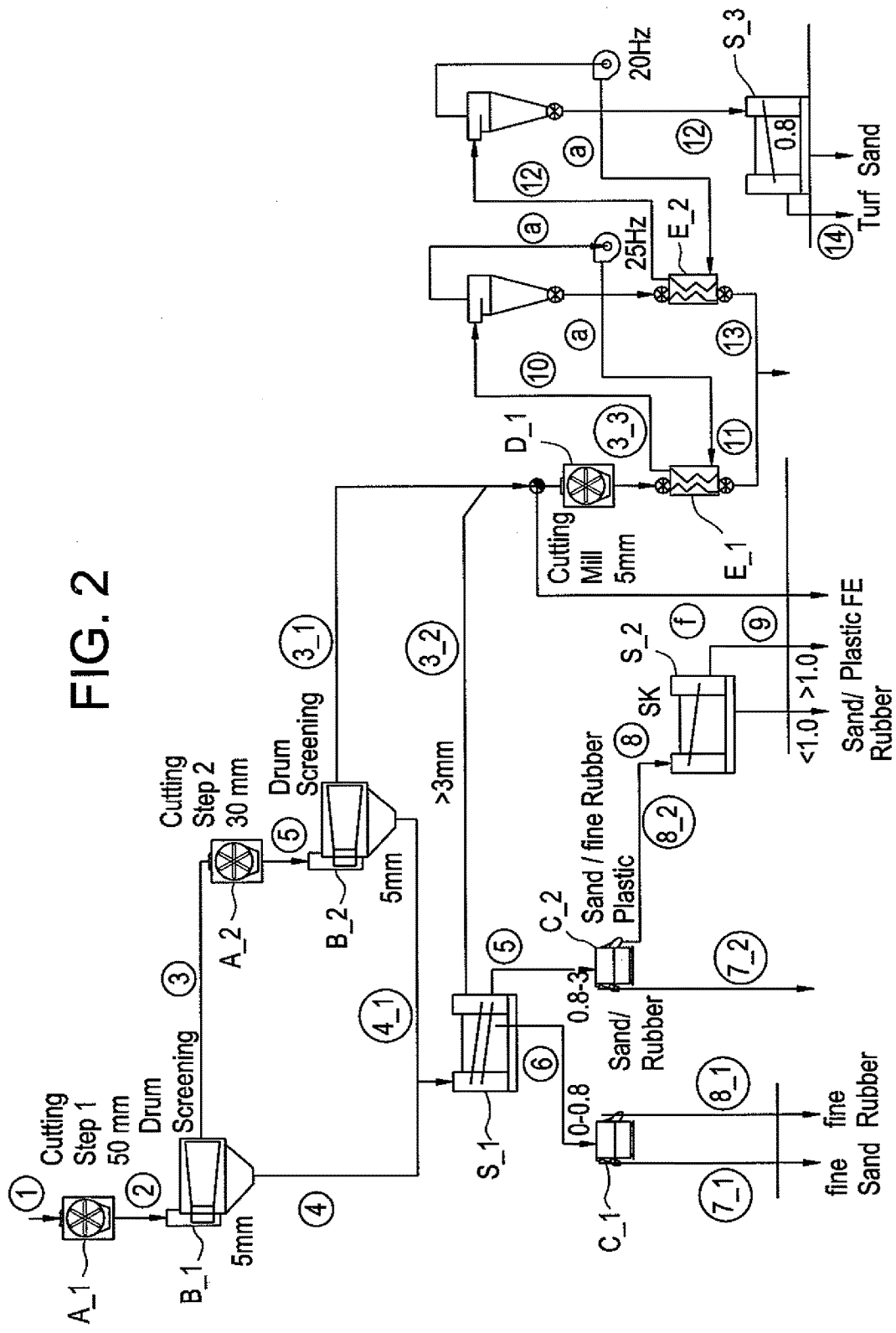
FIG. 2 is an embodiment of the process of the invention in which the synthetic turf product comprises an infill of sand and rubber.

With reference to FIG. 2 an embodiment of the invention will now be described in further detail. In the embodiment illustrated, the artificial turf product in addition to backing material and grass fiber components comprises infill in the form of sand and rubber.

Referring now to FIG. 2, in a first step the synthetic turf product is downsized in a first cutting step by means of a first shredder, A_1, the length of the largest dimension of the downsized material is no more than 50 mm the downsized material, 2, is then sieved through a first drum screen, B_1, having perforations of 5 mm whereby a first fraction, 3, having a size above 5 mm and a second fraction, 4, having a size below 5 mm are provided. The first fraction, 3, is subjected to a second downsizing step in a second shredder, A_2, providing a further downsized material, 5, of no more than 30 mm. The further downsized material is sieved through a second drum screen B_2, having perforations of 5 mm whereby an additional second fraction, 4_1, having a size below 5 mm and an enriched first fraction, 3_1, having a size above 5 mm are provided.

The enriched fraction, 3_1, substantially comprises grass fiber component and the mixed fractions, 4 and 4_1, substantially comprise sand, rubber and backing material.

The second fraction, 4, and the additional second fraction, 4_1, are mixed and further separated by a plurality of sieves corresponding to step (i). Separation is performed in the sieving means, S_1, having one sieve with a mesh size of 3 mm and one sieve with a mesh size of 0.8 mm. The mixed fractions, 4 and 4_1 are sieved through the first sieving means, S_1, to provide a large fraction, 3_2, substantially comprising grass fiber material an intermediate fraction, 5, substantially comprising backing material and a small fraction, 6, substantially comprising sand and rubber.

The small fraction, 6, is further separated by specific gravity, in a separation means, C_1, where air is used to fluidize the low density particles guiding the denser particles to one outlet and the fluidized low density particles to a second outlet to provide a first heavy fraction, 7_1, essentially comprising sand and a first light fraction, 8_1, essentially comprising rubber.

In the example shown, the separators C_1 and C_2 were a TTS Separating Table obtainable No. from Trenn- and Sortiertechnik GmbH.

The intermediate fraction, 5, is also separated by specific gravity, in a separation means, C_2, where air is used to fluidize the low density particles guiding the denser particles to one outlet and the fluidized low density particles to a second outlet to provide a second heavy fraction, 7_2, essentially comprising sand and rubber and a second light fraction, 8_2, essentially comprising backing material, sand and rubber.

The second heavy fraction, 7_2, may be further enriched or discarded as desired to increase the yield.

In the example shown, the separators C_1 and C-2 were TTS separating Tables No. TTS900/1000/1 and TTS600/1000/1 obtainable from Trenn-und Sortiertechnik GmbH.

The second light fraction, 8_2, is then separated by sieving in a second sieve, S_2, having a mesh size of 0.1 mm. The fraction above 1 mm, the backing fraction, 9, is then collected as an end product. The fraction below 1 mm substantially comprising sand and rubber is discarded or further separated.

The enriched fraction, 3_1, and the large fraction, 3_2 are combined. Magnetic contaminants, f, possibly present in the fractions are removed by a magnet positioned after the fractions have merged; the magnetic contaminants are discarded or reused.

After removal of the magnetic contaminants, the merged fractions are downsized in a cutting mill, D_1, to a size of approximately 8 mm. The cutting mill used in the example shown was a type H500/R2-2000, available from Hosokawa Alpine AG, but may be obtained from other suppliers such as Amis Maschinen Vertriebs, Zuzenhausen, Germany.

The merged, downsized fraction, 3_3, substantially comprising grass fiber component is then further enriched in a first separator E_1, providing an airflow configured to cause a swirling motion. In the example shown the first separator, E_1, was an air sifter type ZZS180/800 obtainable from Trenn-und Sortiertechnik GmbH in which the swirling motion is caused by injecting an air flow, a, into zig zag channels within the sorting channel. The air was provided at a frequency of 25 Hz. Other suppliers of zig zag sieves are available such as Hamos GmbH, Penzberg, Germany. The sorting provides a lighter fraction, 10, essentially comprising grass fiber components, and a first heavier fraction, 11, comprising remnants of backing, sand and rubber.

The first heavier fraction, 11, may be discarded or further separated for increasing the yield.

The lighter fraction, 10, essentially comprising grass fiber component is funnelled into a second separator, E_2, similar to the first separator, but where the air was provided at a frequency of 20 Hz. The separation provides a second lighter fraction, 12, essentially comprising grass fiber component and a second heavier fraction, 13, comprising a mixture of remaining backing material, rubber and sand. The second heavier fraction, 13, may be discarded or further separated optionally combined with the first heavier fraction, 11.

The second lighter fraction, 12, is finally enriched for grass fiber components by sieving through a third sieve, S_3, having a mesh size of 0.8 mm. The fraction having a length above 0.8 is collected as the grass fiber fraction, 14, completely purified while, the fraction below 0.8, substantially comprising sand, may be discarded or used as desired.

The essentially pure sand fraction, 7_1, the essentially pure rubber fraction, 8_1, the essentially pure backing material fraction, 9, and the essentially pure grass fiber fraction, 14, are collected and used as starting material in a number of industries as detailed above.

The invention includes at least the following embodiments:

Embodiment 1

A process for separating a dry or dried synthetic turf product comprising at least a backing material, a grass fiber component and additional components said process comprising at least the consecutive steps of
  (a) downsizing the synthetic turf product into a downsized turf material;
  (b) separating the downsized turf material by sieving into at least a first fraction substantially comprising a mixture of the backing material and the additional components and a second fraction substantially comprising grass fiber components;
  (c) separating the first fraction obtained in step (b) by specific gravity using air to provide a low density fraction substantially comprising the backing material and a high density fraction substantially comprising the additional components;
  (d) separating the second fraction obtained in step (b) by specific gravity and size by providing an airflow directed upwards in a separator configured to cause a swirling motion whereby a lighter fraction is entrained upwards in the air flow and a heavy fraction is allowed to fall downwards; where the lighter fraction substantially comprises grass fiber components, and the heavy fraction substantially comprises a mixture of backing material and additional components; and
  (e) collecting the low density fraction obtained in step (c) and the light fraction obtained in step (d).

Embodiment 2

The process according to embodiment 1 where in the sieving of step (b) is performed in a plurality of sets of sieves and/or where the separation by specific gravity of step (c) is performed in a plurality of separating means and where the separation of step (d) is performed in a plurality of sets of separators.

Embodiment 3

The process according to embodiment 1, wherein the additional component comprises an infill and wherein the first fraction obtained in step (b) before step (c) is subjected to an intermediate sieving step (i) to provide a third fraction substantially comprising backing material and a fourth fraction substantially comprising infill, and, wherein the third fraction substantially comprising backing material is further processed in step (c) and the fraction substantially comprising infill is recovered.

Embodiment 4

The process according to embodiment 3, wherein the infill material comprises sand and/or rubber and wherein the fourth fraction is subjected to the further step (f) of separating by specific gravity to provide a low density fraction substantially comprising rubber and a high density fraction substantially comprising sand.

Embodiment 5

The process according to embodiment 3, wherein in the intermediate separation step (i) is performed in a sieve comprising a plurality of sieves, where at least a first sieve has a mesh size of 3 mm; and a least a second sieve has a mesh size 0.8 mm; said separation provides a large fraction where the length of the largest dimension of the downsized material is 3 mm or higher, said first fraction substantially comprising grass fiber components;

an intermediate fraction where the length of the largest dimension of the downsized material is in the range of 0.8 to 3 mm and said intermediate fraction essentially comprising backing material; and a small fraction where the length of the largest dimension is 0.8 mm or smaller, said small fraction substantially comprising infill.

Embodiment 6

The process according to embodiment 1 wherein the second fraction obtained in step (b) is further down sized before being separated by air sifting in step (d), for example in a cutting mill.

Embodiment 7

The process according to embodiment 6, wherein the further downsized fraction has a length of the largest dimension of no more than approximately 10 mm, preferably no more than 8 mm.

Embodiment 8

The process according to embodiment 1, wherein the separation of step (d) is performed in a cyclone separator or a zig-zag air sifter.

Embodiment 9

The process according to embodiment 8, wherein the wherein the separation is performed in a zig-zag air sifter and the air is provided at a frequency of 18-27 Hz, more preferred 20-25 Hz.

Embodiment 10

The process according to embodiment 8, wherein the separation of step (d) is performed in two steps, wherein the frequency of air of the first step is higher than the frequency in the second step, more preferred approximately 25 Hz in the first step and approximately 20 Hz in the second step.

Embodiment 11

A process for separating a dry or dried infill material comprising at least the consecutive steps of:
a) providing an infill material; and
b) subjecting the infill material to a step of separating the infill material by specific gravity to provide a low density fraction and a high density fraction.

Embodiment 12

The process according to embodiment 11, wherein the infill material comprises rubber and sand, and wherein the low density fraction substantially comprises rubber and the high density fraction substantially comprises sand.

Embodiment 13

The process according to embodiment 11, wherein the separation by specific gravity is preceded by a separation step of sieving (i) which sieving step is performed in a sieving means comprising at least one sieve, where a first sieve has a mesh size of 0.8 mm; and
wherein said separation step (i) provides:
a first fraction where a length of a largest dimension is 0.8 mm or higher, said first fraction substantially comprising non-infill material components, and
a small fraction where the length of the largest dimension is 0.8 mm or smaller, said small fraction substantially comprising infill material.

Embodiment 14

The process according to embodiment 13, wherein the at least one sieve of step (i) further comprises a second sieve having a mesh size of 3 mm and wherein said separation step (i) provides:
a large fraction where the length of the largest dimension of the material is 3 mm or higher, said large fraction substantially comprising non-infill material components;
an intermediate fraction where the length of the largest dimension is in the range of 0.8 and 3 mm and said intermediate fraction comprising a mixture of infill material and non-infill material; and
a small fraction where the length of the largest dimension is 0.8 mm or smaller, said small fraction substantially comprising infill material.

Embodiment 15

The process according to embodiment 11, wherein the separation by specific gravity is performed in a separation means where air is used to fluidize low density particles guiding denser particles to a first outlet and the fluidized low density particles to a second outlet thereby providing the high density fraction and the light density fraction.

Embodiment 16

The process according to embodiment 15, wherein the high density fraction comprises sand and the light density fraction comprises rubber.

Embodiment 17

A system for separating a dry or dried infill material, the system comprising:
a) an infill material; and
b) separation means for separating the infill material by specific gravity to provide a low density fraction and a high density fraction.

Embodiment 18

The system according to embodiment 17, wherein the infill material comprises rubber and sand, and wherein the low density fraction substantially comprises rubber and the high density fraction substantially comprises sand.

Embodiment 19

The system according to embodiment 17, further comprising a sieving means comprising at least one sieve for sieving the infill material prior to the separation means, where a first sieve has a mesh size of 0.8 mm and
wherein said sieving means provides:
a first fraction where a length of a largest dimension is 0.8 mm or higher, said first fraction substantially comprising non-infill material components, and
a small fraction where the length of the largest dimension is 0.8 mm or smaller, said small fraction substantially comprising infill material.

Embodiment 20

The system according to embodiment 19, wherein the at least one sieve further comprises a second sieve having a mesh size of 3 mm and wherein said sieving means provides:
a large fraction where the length of the largest dimension of the material is 3 mm or higher, said large fraction substantially comprising non-infill material components;
an intermediate fraction where the length of the largest dimension is in the range of 0.8 and 3 mm and said intermediate fraction comprising a mixture of infill material and non-infill material; and
a small fraction where the length of the largest dimension is 0.8 mm or smaller, said small fraction substantially comprising infill material.

Embodiment 21

The system according to embodiment 17, wherein the separation means includes air to fluidize low density particles and guiding denser particles to a first outlet and the fluidized low density particles to a second outlet to provide the high density fraction and the light density fraction.

Embodiment 22

The system according to embodiment 21, wherein the high density fraction comprises sand and the light density fraction comprises rubber.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A process for separating a dry or dried infill material comprising at least the consecutive steps of:
    a) providing an infill material; and
    b) subjecting the infill material to a step of separating the infill material by specific gravity to provide a low density fraction and a high density fraction,
    wherein the separation by specific gravity is preceded by a separation step of sieving (i) performed in a sieving means; wherein said separation step (i) provides:
    a large fraction where a length of a largest dimension of the material is 3 mm or higher, said large fraction substantially comprising non-infill material components;
    an intermediate fraction where the length of the largest dimension of the material is in the range of 0.8 mm and 3 mm and said intermediate fraction comprising a mixture of infill material and non-infill material; and
    a small fraction where the length of the largest dimension of the material is 0.8 mm or smaller, said small fraction substantially comprising infill material to the sieving means; and the sieving means comprising at least one sieve, where a first sieve has a mesh size of 0.8 mm and a second sieve has a mesh size of 3 mm.

2. The process according to claim 1, wherein the infill material comprises rubber and sand, and wherein the low density fraction substantially comprises rubber and the high density fraction substantially comprises sand.

3. The process according to claim 1, wherein the separation by specific gravity is performed in a separation means where air is used to fluidize low density particles guiding denser particles to a first outlet and the fluidized low density particles to a second outlet thereby providing the high density fraction and the light density fraction.

4. The process according to claim 3, wherein the high density fraction comprises sand and the light density fraction comprises rubber.

5. A system for separating a dry or dried infill material, the system comprising:
    a) an infill material;
    b) separation means for separating the infill material by specific gravity to provide a low density fraction and a high density fraction; and
    c) a sieving means for sieving the infill material prior to the separation means, the sieving means comprising at least one sieve, where a first sieve has a mesh size of 0.8 mm and a second sieve has a mesh size of 3 mm and the sieving means provides:
    a large fraction where a length of a largest dimension of the material is 3 mm or higher, said large fraction substantially comprising non-infill material components;
    an intermediate fraction where the length of the largest dimension of the material is in the range of 0.8 mm and 3 mm and said intermediate fraction comprising a mixture of infill material and non-infill material; and
    a small fraction where the length of the largest dimension of the material is 0.8 mm or smaller, said small fraction substantially comprising infill material.

6. The system according to claim 5, wherein the infill material comprises rubber and sand, and wherein the low density fraction substantially comprises rubber and the high density fraction substantially comprises sand.

7. The system according to claim 5, wherein the separation means includes air to fluidize low density particles and guiding denser particles to a first outlet and the fluidized low density particles to a second outlet to provide the high density fraction and the light density fraction.

8. The system according to claim 7, wherein the high density fraction comprises sand and the light density fraction comprises rubber.

* * * * *